(12) United States Patent
Xu et al.

(10) Patent No.: US 10,662,345 B2
(45) Date of Patent: May 26, 2020

(54) HIGH STAIN RESISTANCE AND EASY CLEANING POLYVINYL CHLORIDE FLOOR AND PREPARATION PROCESS THEREOF

(71) Applicant: Zhejiang Green New Materials Co., LTD, Quzhou (CN)

(72) Inventors: Cheng Xu, Quzhou (CN); Xiangrong Chen, Quzhou (CN); Xingwei Zhu, Quzhou (CN); Xijun Xu, Quzhou (CN); Xiaolu Jiang, Quzhou (CN); Hong Xu, Quzhou (CN); Huahong Yan, Quzhou (CN); Haizhong Wu, Quzhou (CN)

(73) Assignee: Zhejiang Green New Materials Co., Ltd., Quzhou (CN)

( * ) Notice: Subject to any disclaimer, the term of this patent is extended or adjusted under 35 U.S.C. 154(b) by 103 days.

(21) Appl. No.: 15/706,671

(22) Filed: Sep. 16, 2017

(65) Prior Publication Data
US 2018/0142115 A1 May 24, 2018

(30) Foreign Application Priority Data

Nov. 24, 2016 (CN) .......................... 2016 1 1049745

(51) Int. Cl.
| | | |
|---|---|---|
| C09D 127/12 | (2006.01) | |
| B32B 27/08 | (2006.01) | |
| C08L 27/12 | (2006.01) | |
| C08L 27/06 | (2006.01) | |
| E04F 15/02 | (2006.01) | |
| E04F 15/10 | (2006.01) | |
| C09D 133/04 | (2006.01) | |
| C09J 133/04 | (2006.01) | |
| B32B 27/30 | (2006.01) | |
| C08J 7/04 | (2020.01) | |

(52) U.S. Cl.
CPC ............ C09D 127/12 (2013.01); B32B 27/08 (2013.01); B32B 27/304 (2013.01); C08J 7/0427 (2020.01); C08L 27/06 (2013.01); C08L 27/12 (2013.01); C09D 133/04 (2013.01); C09J 133/04 (2013.01); E04F 15/02 (2013.01); E04F 15/105 (2013.01)

(58) Field of Classification Search
CPC ......... E04F 15/105; C08L 27/06; C08L 27/12
See application file for complete search history.

(56) References Cited

U.S. PATENT DOCUMENTS

| | | | | |
|---|---|---|---|---|
| 2017/0144409 | A1* | 5/2017 | Ting ..................... | B32B 27/308 |
| 2018/0304601 | A1* | 10/2018 | Song ..................... | B32B 27/304 |

FOREIGN PATENT DOCUMENTS

| | | | | |
|---|---|---|---|---|
| CN | 101163762 A | | 4/2008 | |
| CN | 101619615 A | | 1/2010 | |
| CN | 105196778 A | | 12/2015 | |
| CN | 105908946 A | | 8/2016 | |
| CN | 106626649 A | * | 5/2017 | ............ E04F 15/105 |
| CN | 106626669 A | * | 5/2017 | |

OTHER PUBLICATIONS

Machine translation of CN 106626649 A, retrieved Jun. 2019. (Year: 2019).*
Machine translation of CN 105196778 A, retrieved Jun. 2019. (Year: 2019).*

* cited by examiner

Primary Examiner — Nicole M. Buie-Hatcher
(74) Attorney, Agent, or Firm — Wayne & Ken, LLC; Tony Hom

(57) ABSTRACT

The present invention discloses a polyvinyl chloride floor with high stain resistance and easy cleaning functions. The polyvinyl chloride floor includes a polyvinyl chloride floor layer and a stain-resistant surface layer, wherein the stain-resistant surface layer is formed by co-extruding an outer protective layer, a functional layer and an adhesive layer; the outer protective layer is a fluorine-containing polymer; the functional layer is formed by mixing the fluorine-containing polymer, a hot melt adhesive and functional aids; the adhesive layer is formed by mixing the fluorine-containing polymer and the hot melt adhesive; and the stain-resistant surface layer is in hot-melt adhesion connection with the polyvinyl chloride floor layer through the adhesive layer. The present invention has advantages of green environmental protection, high wear resistance, water resistance, moisture resistance, bacterial resistance, stain resistance and difficulty in leaving traces.

7 Claims, 1 Drawing Sheet

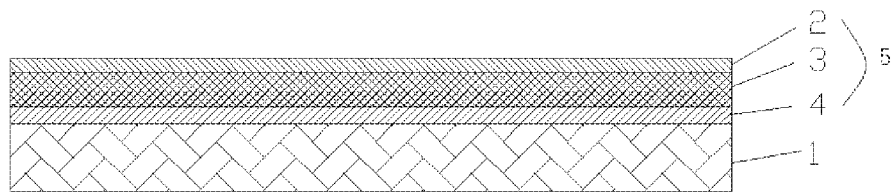

HIGH STAIN RESISTANCE AND EASY CLEANING POLYVINYL CHLORIDE FLOOR AND PREPARATION PROCESS THEREOF

TECHNICAL FIELD

The present invention relates to a polyvinyl chloride floor with high stain resistance and easy cleaning functions and a preparation process thereof.

BACKGROUND OF THE INVENTION

A polyvinyl chloride floor is a very popular novel lightweight ground decoration material in current world and is also called a "lightweight material". The polyvinyl chloride floor is a popular product in Europe and America and Japan and South Korea in Asia, is fashionable abroad, starts to enter the Chinese market in the early 1980s, has been universally accepted in large and medium cities in China and is widely used in various places such as families, hospitals, schools, office buildings, factories, public places, supermarkets, commerce, sports fields and the like. However, an existing polyvinyl chloride floor has defects that the floor has many organic volatile gases, is inconvenient to be maintained, is not resistant to iodine or other chemical reagents and is easily stained to leave traces and the like, thereby limiting an application range of the polyvinyl chloride floor.

SUMMARY OF THE INVENTION

In order to solve the above technical problems, the present invention provides a polyvinyl chloride floor with wear resistance, stain resistance and difficulty in trace leaving and with high stain resistance and easy cleaning functions and a preparation process thereof.

The high stain resistance and easy cleaning polyvinyl chloride floor in the present invention comprises a polyvinyl chloride floor layer and a stain-resistant surface layer with a thickness ratio of 40:1, wherein the stain-resistant surface layer is formed by co-extruding an outer protective layer, a functional layer and an adhesive layer according to a thickness ratio of 1:3:1; the outer protective layer is a fluorine-containing polymer; the functional layer is formed by mixing the fluorine-containing polymer, a hot melt adhesive and functional aids according to a ratio of (20-100):(0-60):(0.5-20); the adhesive layer is formed by mixing the fluorine-containing polymer and the hot melt adhesive according to a ratio of (0-40):(60-100); the stain-resistant surface layer is in hot-melt adhesion connection with the polyvinyl chloride floor layer through one side of the adhesive layer; and the stain-resistant surface layer sequentially comprises the adhesive layer, the functional layer and the outer protective layer from bottom to top.

Further, the fluorine-containing polymer is one or more of a mixture of polyfluorinated ethylene-propylene, ethylenetetrafluoroethylene, polytetrafluoroethylene-perfluoropropyl vinylether, polyvinylidene fluoride, polytetrafluoroethylene, polytetrafluoroethylene-perfluoromethyl vinylether, polyvinyl chloride trifluoroethylene, polychloro trifluoroethylene and polytetrafluoroethylene-hexafluoropropylene-vinylidene fluoride.

Further, the functional aids comprise one or more of an ultraviolet absorbent, a flexibilizer, an antioxidant, an antifreezing agent, a heat stabilizer, a light stabilizer or an antistatic agent.

Further, the hot melt adhesive comprises one or more of a modified polyacrylic resin, a polyethylene-vinyl acetate resin, a polyvinyl butyral resin or a polyamide hot melt adhesive.

Further, the polyvinyl chloride floor layer comprises one of a composite dense type polyvinyl chloride floor layer, a composite foaming type polyvinyl chloride floor layer or a homogeneous permeable polyvinyl chloride floor layer.

A preparation process of the high stain resistance and easy cleaning polyvinyl chloride floor comprises the following steps: a. respectively granulating the outer protective layer, the functional layer and the adhesive layer according to a formula, and then co-extruding the three layers to form a film to prepare the stain-resistant surface layer, and rolling for later use; b. unreeling and contacting the stain-resistant surface layer and the polyvinyl chloride floor layer, so that the adhesive layer of the stain-resistant surface layer and a printing layer of the polyvinyl chloride floor are superposed and then subjected to hot-press compounding; and c. embossing, slitting and reeling to obtain the product.

Further, the step a of co-extruding the three layers to form the film comprises one of the following: co-extruding the three layers for film blowing, co-extruding the three layers for film stretching and co-extruding the three layers for film casting.

The fluorine-containing polymer used in the outer protective layer in the present application has tightly arranged molecular chains and has strong hydrogen bonds, so the high polymer has excellent chemical resistance, high temperature resistance, oxidation resistance, weather resistance and ray radiation resistance and also has special properties such as piezoelectricity, dielectricity, pyroelectricity and the like. The outer protective layer used for the outermost layer in the present application has effects of excellent weather resistance, wear resistance, stain resistance and difficulty to leave traces.

Since the functional aids are added into the functional layer, the functional layer in the present application has functions including ultraviolet resistance, high toughness, oxidation resistance, cold resistance, antistatic property, excellent light and heat stability, and different functional aids are added according to specific conditions, so that the functional layer has different functions; meanwhile, the functional layer has a transition effect, is mainly a mixed material of the fluorine-containing polymer and hot melt adhesive resin and is used for realizing transition between the outer protective layer which is basically the fluorine-containing polymer and the adhesive layer which is basically the hot melt adhesive. If the functional layer for transition does not exist, the outer protective layer and the adhesive layer cannot be well compatible and are easily layered and separated.

The adhesive layer in the present application comprises the hot melt adhesive, is selectively mixed with a small amount of the material of the outer protective layer, that is, the fluorine-containing polymer, and is used for improving co-extrusion connectivity with the functional layer. The hot melt adhesive is used for bonding the polyvinyl chloride floor, and adhesion can be realized at a temperature of 100-170° C.

The high stain resistance and easy cleaning polyvinyl chloride floor and the preparation process thereof in the present invention have beneficial effects as follows:

1. green and environmental-friendly: the stain-resistant surface layer is made of an environmental-friendly and nontoxic material and is capable of isolating volatile organic matters released by the polyvinyl chloride floor layer (release of volatile organic compounds);

2. ultra-light and ultra-thin: a thickness is only 1.6-3 mm, weight per square meter is only 2-3 kg and is less than 10% of that of an ordinary ground material, and the polyvinyl chloride floor has incomparable advantages in aspects of building weight bearing and space saving in a high-rise building and also has special advantages in old building reconstruction;

3. highly wear-resistant: the stain-resistant surface layer is a transparent protective film taking the fluorine-containing polymer as a principle component, and covers the polyvinyl chloride floor layer to enable that a wear resistance level of the polyvinyl chloride floor is increased by 30% or higher compared with the highest polyvinyl chloride level in a market, and service life of the floor can reach 10 years or longer. Therefore, the polyvinyl chloride floor is applicable to places with a large flow of people, such as hospitals, schools, office buildings, shopping malls, supermarkets, media of communication and the like;

4. waterproof, moisture-proof and antibacterial: the fluorine-containing polymer in the stain-resistant surface layer is a hydrophobic material, has high capacity of killing most of bacteria and capacity of inhibiting bacterial reproduction, is waterproof and moisture-proof, is not changed even if soaked in water within a month, and is difficult to be mildewed in a high-humidity environment;

5. highly stain-repellent: the fluorine-containing polymer in the stain-resistant surface layer is a chemically inert material, can be erosion-resistant to most of chemical solvents (comprising iodine reagents which are extremely easy to be stained in a traditional polyvinyl chloride floor), has excellent acid and alkali resistance and does not leave traces on a chemical agent with a pH value of 1-14 within 72 h;

6. easy to clean: the fluorine-containing polymer in the stain-resistant surface layer is a hydrophobic material, is very low in surface tension and is difficult to be stained by dust or sundries, so that the material is easy to clean; and 7. highly weather-resistant: the fluorine-containing polymer in the stain-resistant surface layer has high chemical stability and can resist light and oxygen damp-heat aging, thereby prolonging service life of the ordinary polyvinyl chloride floor layer.

BRIEF DESCRIPTION OF THE DRAWINGS

FIGURE is a structural schematic diagram of a high stain resistance and easy cleaningpolyvinyl chloride floor in the present invention.

DETAILED DESCRIPTION OF THE INVENTION

Technical solutions in embodiments of the present invention are clearly and completely described below in combination with drawings in embodiments of the present invention. Apparently, the described embodiments are only part of embodiments in the present invention rather than all of embodiments. Based on embodiments in the present invention, all other embodiments obtained by those ordinary skilled in the art without contributing creative work belong to a protection scope of the present invention.

Embodiment 1

As shown in the FIGURE, a polyvinyl chloride floor with high stain resistance and easy cleaning functions in the present embodiment comprises a composite dense type polyvinyl chloride floor layer 1 and a stain-resistant surface layer 5 according to a thickness ratio of 40:1. The stain-resistant surface layer 5 is formed by co-extruding an outer protective layer 2, a functional layer 3 and an adhesive layer 4 according to a thickness ratio of 1:3:1; the outer protective layer 2 is formed by mixing fluorine-containing polymers, that is, polyvinylidene fluoride and polytetrafluoroethylene according to a ratio of 100:3; the functional layer 3 is formed by mixing polyvinylidene fluoride, modified polyacrylic resin and an ultraviolet absorbent according to a ratio of 80:20:0.5; the adhesive layer 4 is formed by mixing the polyvinylidene fluoride and the modified polyacrylic resin according to a ratio of 20:80; the stain-resistant surface layer 5 is in hot-melt adhesion connection with the composite dense type polyvinyl chloride floor layer 1 through one side of the adhesive layer 4; and the stain-resistant surface layer 5 sequentially comprises the adhesive layer 4, the functional layer 3 and the outer protective layer 2 from bottom to top.

A preparation process of the polyvinyl chloride floor with high stain resistance and easy cleaning functions comprises the following steps: a. respectively granulating the outer protective layer 2, the functional layer 3 and the adhesive layer 4 according to a formula, and then co-extruding the three layers into a film to prepare the stain-resistant surface layer 5, and rolling for later use; b. unreeling and contacting the stain-resistant surface layer 5 and the polyvinyl chloride floor layer 1, so that the adhesive layer 4 of the stain-resistant surface layer 5 and a printing layer of the polyvinyl chloride floor are superposed and then subjected to hot-press compounding; and c. embossing, slitting and reeling to obtain the product.

Embodiment 2

As shown in the FIGURE, a polyvinyl chloride floor with high stain resistance and easy cleaning functions in the present embodiment comprises a composite dense type polyvinyl chloride floor layer 1 and a stain-resistant surface layer 5 according to a thickness ratio of 40:1. The stain-resistant surface layer 5 is formed by co-extruding an outer protective layer 2, a functional layer 3 and an adhesive layer 4 according to a thickness ratio of 1:3:1; the outer protective layer 2 is a fluorine-containing polymer; the functional layer 3 is formed by mixing polyvinylidene fluoride and an ultraviolet absorbent according to a ratio of 100:0.5; the adhesive layer 4 is formed by mixing the polyvinylidene fluoride and the modified polyacrylic resin according to a ratio of 10:90; and the stain-resistant surface layer 5 is in hot-melt adhesion connection with the composite foaming type polyvinyl chloride floor layer 1 through one side of the adhesive layer 4.

A preparation process of the polyvinyl chloride floor with high stain resistance and easy cleaning functions comprises the following steps: a. respectively granulating the outer protective layer 2, the functional layer 3 and the adhesive layer 4 according to a formula, and then co-extruding the three layers into a film to prepare the stain-resistant surface layer 5, and rolling for later use; b. unreeling and contacting the stain-resistant surface layer 5 and the polyvinyl chloride floor layer 1, so that the adhesive layer 4 of the stain-resistant surface layer 5 and a printing layer of the polyvinyl chloride floor are superposed and then subjected to hot-press compounding; and c. embossing, slitting and reeling to obtain the product.

Embodiment 3

As shown in the FIGURE, a polyvinyl chloride floor with high stain resistance and easy cleaning functions in the present embodiment comprises a composite dense type polyvinyl chloride floor layer 1 and a stain-resistant surface layer 5 according to a thickness ratio of 40:1. The stain-resistant surface layer 5 is formed by co-extruding an outer protective layer 2, a functional layer 3 and an adhesive layer 4 according to a thickness ratio of 1:3:1; the outer protective layer 2 is formed by mixing fluorine-containing polymers, that is, polyvinylidene fluoride and polytetrafluoroethylene, according to a ratio of 100:3; the functional layer 3 is formed by mixing polyvinylidene fluoride, a modified polyacrylic resin and an ultraviolet absorbent according to a ratio of 20:80:0.5; the adhesive layer 4 is formed by mixing the polyvinylidene fluoride and the modified polyacrylic resin according to a ratio of 20:80; and the stain-resistant surface layer 5 is in hot-melt adhesion connection with a homogeneous permeable polyvinyl chloride floor layer 1 through one side of the adhesive layer 4.

A preparation process of the polyvinyl chloride floor with high stain resistance and easy cleaning functions comprises the following steps: a. respectively granulating the outer protective layer 2, the functional layer 3 and the adhesive layer 4 according to a formula, and then co-extruding the three layers into a film to prepare the stain-resistant surface layer 5, and rolling for later use; b. unreeling and contacting the stain-resistant surface layer 5 and the polyvinyl chloride floor layer 1, so that the adhesive layer 4 of the stain-resistant surface layer 5 and a printing layer of the polyvinyl chloride floor are superposed and then subjected to hot-press compounding; and c. embossing, slitting and reeling to obtain the product.

Quality detection results of the above embodiments are shown in a table as follows:

| Technical indexes | Fire resistance/ class | Slip resistance/ Group | TVOC/ g/m2 | Wear resistance/ Group | Residual indentation/ mm | Color fastness/Rating | Stain resistance | Sound absorption/ dB | Dimensional stability/% |
|---|---|---|---|---|---|---|---|---|---|
| Test standard | EN135 01-1 | DIN 51130 | GB 18586 | EN 649 | EN 433 | ISO 105-B02 | EN 423 | ISO1 40-8 | EN 434 |
| Embodiment 1 | Bfl-s1 | ≥R9 | <2 | T | 0.02 | ≥6 | No Stain | 11 | <0.4 |
| Embodiment 2 | Bfl-s1 | ≥R9 | <2 | T | 0.02 | ≥6 | No Stain | 11 | <0.4 |
| Embodiment 3 | Bfl-s1 | ≥R9 | <2 | T | 0.03 | ≥6 | No Stain | 10 | <0.4 |
| Embodiment 4 | Bfl-s1 | ≥R9 | <2 | T | 0.04 | ≥6 | No Stain | 10 | <0.4 |

A preparation process of the polyvinyl chloride floor with high stain resistance and easy cleaning functions comprises the following steps: a respectively granulating the outer protective layer 2, the functional layer 3 and the adhesive layer 4 according to a formula, and then co-extruding the three layers into a film to prepare the stain-resistant surface layer 5, and rolling for later use; b. unreeling and contacting the stain-resistant surface layer 5 and the polyvinyl chloride floor layer 1, so that the adhesive layer 4 of the stain-resistant surface layer 5 and a printing layer of the polyvinyl chloride floor are superposed and then subjected to hot-press compounding; and c. embossing, slitting and reeling to obtain the product.

Embodiment 4

As shown in the FIGURE, a polyvinyl chloride floor with high stain resistance and easy cleaning functions in the present embodiment comprises a composite dense type polyvinyl chloride floor layer 1 and a stain-resistant surface layer 5 according to a thickness ratio of 40:1. The stain-resistant surface layer 5 is formed by co-extruding an outer protective layer 2, a functional layer 3 and an adhesive layer 4 according to a thickness ratio of 1:3:1; the outer protective layer 2 is formed by mixing fluorine-containing polymers, that is, polychloro trifluoroethylene and polychloro trifluoroethylene, according to a ratio of 100:5; the functional layer 3 is formed by mixing polychloro trifluoroethylene and a functional aid according to a ratio of 86:14; the functional aid is formed by mixing a light stabilizer and an antistatic agent according to a ratio of 4:10; the adhesive layer 4 is polychloro trifluoroethylene; and the stain-resistant surface layer 5 is in hot-melt adhesion connection with a foaming type polyvinyl chloride floor layer 1 through one side of the adhesive layer 4.

The above data show that the polyvinyl chloride floor with high stain resistance and easy cleaning functions and the preparation process thereof in the above embodiments have beneficial effects as follows:

1. green and environmental-friendly: the stain-resistant surface layer 5 is made of an environmental-friendly and nontoxic material and is capable of isolating volatile organic matters released by the polyvinyl chloride floor layer (release of volatile organic compounds);

2. ultra-light and ultra-thin: a thickness is only 1.6-3 mm, weight per square meter is only 2-3 kg and is less than 10% of that of an ordinary ground material, and the polyvinyl chloride floor has incomparable advantages in aspects of building weight bearing and space saving in a high-rise building and also has special advantages in old building reconstruction;

3. highly wear-resistant: the stain-resistant surface layer 5 is a transparent protective film taking the fluorine-containing polymer as a principle component, and covers the polyvinyl chloride floor layer to enable that a wear resistance level of the polyvinyl chloride floor is improved by 30% or higher compared with the highest polyvinyl chloride level in a market, and service life of the floor can reach 10 years or longer. Therefore, the polyvinyl chloride floor is applicable to places with a large flow of people, such as hospitals, schools, office buildings, shopping malls, supermarkets, media of communication and the like;

4. waterproof, moisture-proof and antibacterial: the fluorine-containing polymer in the stain-resistant surface layer 5 is a hydrophobic material, has high capacity of killing most of bacteria and capacity of inhibiting bacterial reproduction, is waterproof and moisture-proof, is not changed even if soaked in water within a month, and is difficult to be mildewed in a high-humidity environment;

5. highly stain-repellent: the fluorine-containing polymer in the stain-resistant surface layer 5 is a chemically inert material, can be erosion-resistant to most of chemical solvents (comprising iodine reagents which are extremely easy to be stained in a traditional polyvinyl chloride floor), has excellent acid and alkali resistance and does not leave traces on a chemical agent with a pH value of 1-14 within 72 h;

6. easy to clean: the fluorine-containing polymer in the stain-resistant surface layer 5 is a hydrophobic material, is very low in surface tension and is difficult to be stained by dust or sundries, so that the material is easy to clean; and 7. highly weather-resistant: the fluorine-containing polymer in the stain-resistant surface layer 5 has high chemical stability and can resist light and oxygen damp-heat aging, thereby prolonging service life of the ordinary polyvinyl chloride floor layer.

In addition, it should be understood that although the present description is described according to embodiments, but not each embodiment only includes one independent technical solution. Such a narrative way of the description is only for clarification. Those skilled in the art should take the description as a whole, and the technical solutions in embodiments can be properly combined to form other embodiments which can be understood by those skilled in the art.

What is claimed is:

1. A high stain resistance and easy cleaning polyvinyl chloride floor, characterized by comprising:
   a polyvinyl chloride floor layer and a stain-resistant surface layer with a thickness ratio of 40:1;
   wherein the stain-resistant surface layer is formed by co-extruding an outer protective layer, a functional layer and an adhesive layer according to a thickness ratio of 1:3:1;
   the outer protective layer is a fluorine-containing polymer; the functional layer is formed by mixing the fluorine-containing polymer, a hot melt adhesive and functional aids according to a ratio of (20-100):(0-80):(0.5-20);
   the adhesive layer is formed by mixing the fluorine-containing polymer and the hot melt adhesive according to a ratio of (0-40):(60-100);
   the stain-resistant surface layer is in hot-melt adhesion connection with the polyvinyl chloride floor layer through one side of the adhesive layer; and
   the stain-resistant surface layer sequentially comprises the adhesive layer, the functional layer and the outer protective layer from bottom to top.

2. The polyvinyl chloride floor of claim 1, wherein the fluorine-containing polymer is one or more of or a mixture of polyfluorinated ethylene-propylene, polyethylene-tetrafluoroethylene, polytetrafluoroethylene-perfluoropropyl vinylether, polyvinylidene fluoride, polytetrafluoroethylene, polytetrafluoroethylene-perfluoromethyl vinylether, polyvinyl chloride trifluoroethylene, polychloro trifluoroethylene and polytetrafluoroethylene-hexafluoropropylene-vinylidene fluoride.

3. The polyvinyl chloride floor of claim 1, wherein the functional aids comprise one or more of an ultraviolet absorbent, a flexibilizer, an antioxidant, an anti-freezing agent, a heat stabilizer, a light stabilizer or an antistatic agent.

4. The polyvinyl chloride floor of claim 1, wherein the hot melt adhesive comprises one or more of a modified polyacrylic resin, a polyethylene-vinyl acetate resin, a polyvinyl butyral resin or a polyamide hot melt adhesive.

5. The polyvinyl chloride floor of claim 1, wherein the polyvinyl chloride floor layer comprises one of a composite dense type polyvinyl chloride floor layer, a composite foaming type polyvinyl chloride floor layer or a homogeneous permeable polyvinyl chloride floor layer.

6. A preparation process of the high stain resistance and easy cleaning polyvinyl chloride floor of claim 1, comprising the following steps:
   a) respectively granulating the outer protective layer, the functional layer and the adhesive layer according to a formula, and co-extruding the three layers to form a film to prepare the stain-resistant surface layer, and rolling for later use;
   b) unreeling and contacting the stain-resistant surface layer and the polyvinyl chloride floor layer, so that the adhesive layer of the stain-resistant surface layer and a printing layer of the polyvinyl chloride floor are superposed and then subjected to hot-press compounding; and
   c) embossing, slitting and reeling to obtain the polyvinyl chloride floor.

7. The preparation process of claim 6, wherein the step of co-extruding the three layers to form the film comprises one of the following: co-extruding the three layers for film blowing, co-extruding the three layers for film stretching and co-extruding the three layers for film casting.

* * * * *